(12) United States Patent  
Edelsten et al.

(10) Patent No.: US 12,277,406 B2
(45) Date of Patent: Apr. 15, 2025

(54) AUTOMATIC DATASET CREATION USING SOFTWARE TAGS

(71) Applicant: NVIDIA Corporation, Santa Clara, CA (US)

(72) Inventors: Andrew Edelsten, Morgan Hill, CA (US); Jen-Hsun Huang, Los Altos Hills, CA (US); Bojan Skaljak, San Jose, CA (US); Tony Tamasi, Portola Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 664 days.

(21) Appl. No.: 16/537,255

(22) Filed: Aug. 9, 2019

(65) Prior Publication Data

US 2020/0050936 A1    Feb. 13, 2020

Related U.S. Application Data

(60) Provisional application No. 62/717,735, filed on Aug. 10, 2018.

(51) Int. Cl.
*G06N 3/08*     (2023.01)
*G06F 8/30*     (2018.01)
(Continued)

(52) U.S. Cl.
CPC ............... *G06F 8/30* (2013.01); *G06F 8/71* (2013.01); *G06F 9/541* (2013.01); *G06F 18/214* (2023.01);

(Continued)

(58) Field of Classification Search
CPC ............ H04L 67/42; H04L 67/00; G06N 3/08
See application file for complete search history.

(56) References Cited

U.S. PATENT DOCUMENTS

| 8,364,613 B1 | 1/2013 | Lin et al. |
| 8,417,715 B1 * | 4/2013 | Bruckhaus ............. G06Q 10/04 705/26.1 |

(Continued)

OTHER PUBLICATIONS

Edelsten et al., U.S. Appl. No. 16/537,215, filed Aug. 9, 2019.

(Continued)

*Primary Examiner* — Minh Chau Nguyen
(74) *Attorney, Agent, or Firm* — Davis Wright Tremaine LLP

(57) ABSTRACT

Traditionally, a software application is developed, tested, and then published for use by end users. Any subsequent update made to the software application is generally in the form of a human programmed modification made to the code in the software application itself, and further only becomes usable once tested, published, and installed by end users having the previous version of the software application. This typical software application lifecycle causes delays in not only generating improvements to software applications, but also to those improvements being made accessible to end users. To help avoid these delays and improve performance of software applications, deep learning models may be made accessible to the software applications for use in providing inferenced data to the software applications, which the software applications may then use as desired. These deep learning models can furthermore be improved independently of the software applications using manual and/or automated processes.

20 Claims, 12 Drawing Sheets

(51) Int. Cl.

| | |
|---|---|
| *G06F 8/71* | (2018.01) |
| *G06F 9/54* | (2006.01) |
| *G06F 18/214* | (2023.01) |
| *G06N 3/04* | (2023.01) |
| *G06N 3/082* | (2023.01) |
| *G06N 3/10* | (2006.01) |
| *G06T 5/70* | (2024.01) |
| *G06V 10/774* | (2022.01) |
| *G06V 10/82* | (2022.01) |
| *H04L 67/01* | (2022.01) |
| *G06F 8/65* | (2018.01) |
| *G06F 8/70* | (2018.01) |

(52) U.S. Cl.
CPC ............... *G06N 3/04* (2013.01); *G06N 3/08* (2013.01); *G06N 3/082* (2013.01); *G06N 3/10* (2013.01); *G06T 5/70* (2024.01); *G06V 10/774* (2022.01); *G06V 10/82* (2022.01); *G06F 8/65* (2013.01); *G06F 8/70* (2013.01); *H04L 67/01* (2022.05)

(56) References Cited

U.S. PATENT DOCUMENTS

| | | |
|---|---|---|
| 8,719,192 B2 | 5/2014 | Ji et al. |
| 9,946,576 B2 | 4/2018 | van Velzen et al. |
| 10,713,543 B1 | 7/2020 | Skuin et al. |
| 11,410,024 B2 | 8/2022 | Barik et al. |
| 11,481,652 B2 | 10/2022 | Knox |
| 2002/0194039 A1 | 12/2002 | Bhaskaran et al. |
| 2016/0078361 A1* | 3/2016 | Brueckner .............. H04L 67/10 706/12 |
| 2017/0061249 A1* | 3/2017 | Estrada ................ G06V 10/454 |
| 2017/0192957 A1 | 7/2017 | Ide et al. |
| 2017/0353991 A1 | 12/2017 | Tapia |
| 2018/0268244 A1* | 9/2018 | Moazzami ........... G06K 9/6256 |
| 2019/0012576 A1* | 1/2019 | Liu ...................... G06K 9/6215 |
| 2019/0037005 A1 | 1/2019 | Palladino et al. |
| 2019/0042887 A1 | 2/2019 | Nguyen et al. |
| 2019/0042955 A1 | 2/2019 | Cahill et al. |
| 2019/0102098 A1 | 4/2019 | Biswas et al. |
| 2019/0155633 A1 | 5/2019 | Faulhaber, Jr. et al. |
| 2019/0180189 A1 | 6/2019 | Biesemann et al. |
| 2019/0197396 A1* | 6/2019 | Rajkumar .............. B25J 9/1671 |
| 2019/0278870 A1 | 9/2019 | Novielli et al. |
| 2019/0279114 A1 | 9/2019 | Deshpande et al. |
| 2020/0050443 A1 | 2/2020 | Edelsten et al. |
| 2020/0050935 A1 | 2/2020 | Edelsten et al. |
| 2020/0050936 A1 | 2/2020 | Edelsten et al. |
| 2020/0125941 A1 | 4/2020 | Gold et al. |
| 2020/0349365 A1 | 11/2020 | Behrendt |
| 2021/0209468 A1 | 7/2021 | Matsumoto et al. |
| 2021/0266225 A1 | 8/2021 | Kozhaya et al. |
| 2021/0390653 A1 | 12/2021 | Tremblay et al. |

OTHER PUBLICATIONS

Edelsten et al., U.S. Appl. No. 16/537,242, filed Aug. 9, 2019.
Non-Final Office Action issued in U.S. Appl. No. 16/537,242, dated Oct. 6, 2021.

* cited by examiner

AUTOMATIC DATASET CREATION USING SOFTWARE TAGS

RELATED APPLICATION(S)

This application claims the benefit of U.S. Provisional Application No. 62/717,735, titled "CONTINUOUS OPTIMIZATION AND UPDATE SYSTEM FOR DEEP LEARNING MODELS," filed Aug. 10, 2018, the entire contents of which is incorporated herein by reference.

This application is related to co-pending U.S. application Ser. No. 16/537,215, titled "OPTIMIZATION AND UPDATE SYSTEM FOR DEEP LEARNING MODELS" filed Aug. 9, 2019, the entire contents of which is incorporated herein by reference.

This application is related to co-pending U.S. application Ser. No. 16/537,242, titled "DEEP LEARNING MODEL EXECUTION USING TAGGED DATA" filed Aug. 9, 2019, the entire contents of which is incorporated herein by reference.

TECHNICAL FIELD

The present disclosure relates to improving deep learning models.

BACKGROUND

Traditionally, a software application is developed, tested, and then published for use to end users. Any subsequent update made to the software application is generally in the form of a human programmed modification made to the code in the software application itself, and further only becomes usable once tested and published by developers and/or publishers, and installed by end users having the previous version of the software application. This typical software application lifecycle causes delays in not only generating improvements to software applications, but also to those improvements being made accessible to end users.

There is a need for addressing these issues and/or other issues associated with the prior art.

SUMMARY

A method, computer readable medium, and system are disclosed for creating a dataset using tagged data for use in improving a deep learning model. In one embodiment, one or more dataset inputs defined for a deep learning model are determined. Additionally, metadata associated with data of a software application is used to retrieve one or more portions of the data that satisfy the one or more dataset inputs. Further, a dataset is created from the retrieved one or more portions of the data for use in training the deep learning model.

DETAILED DESCRIPTION

Figure 1:
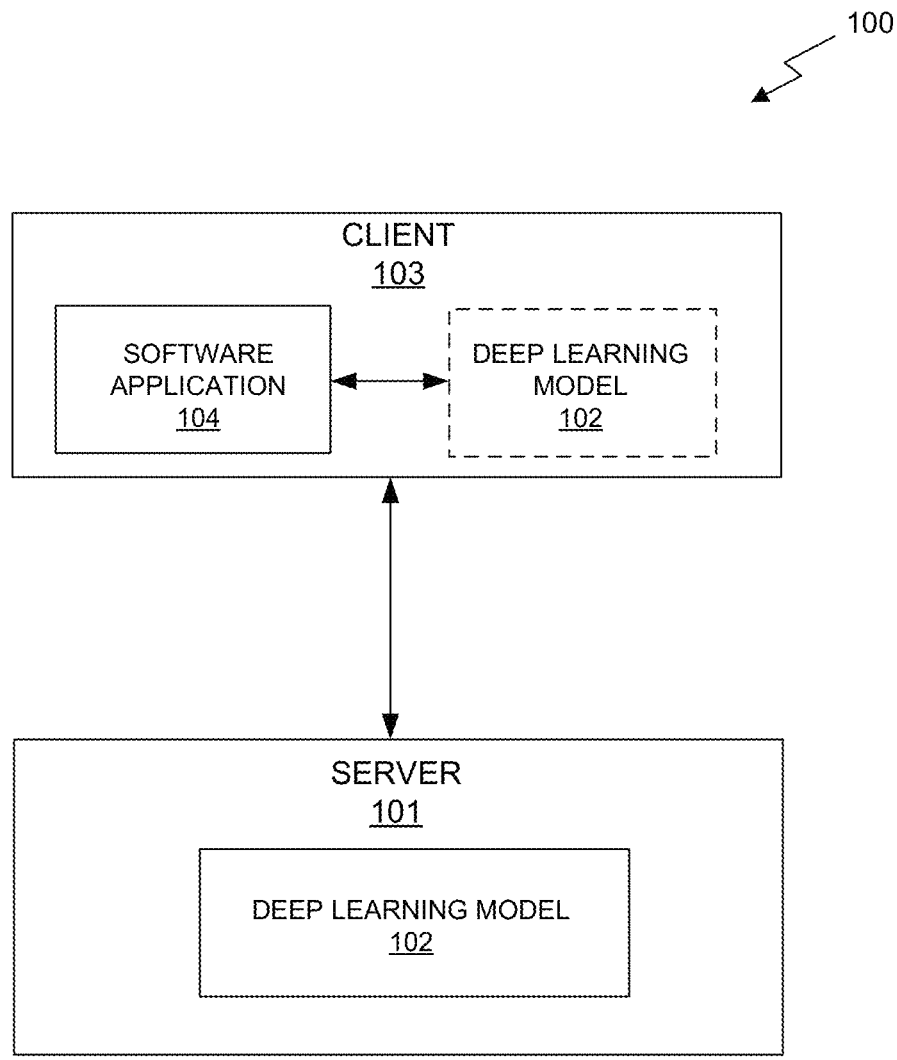
FIG. 1 illustrates a block diagram of a system including a server that provisions a deep learning model to a client for use by a software application installed on the client, in accordance with an embodiment.

FIG. 1 illustrates a block diagram of a system 100 including a server 101 that provisions a deep learning model 102 to a client 103 for use with a software application 104 installed (instantiated) on the client 103, in accordance with an embodiment.

With respect to the present description, the server 101 may be any computing device, partially or wholly virtualized computing device, or combination of devices, capable of communicating with the client 103 over a wired or wireless connection, for the purpose of provisioning the deep learning model 102 to the client 103 for use by a software application 104 installed on the client 103. For example, the server 101 may include a hardware memory (e.g. random access memory (RAM), etc.) for storing the deep learning model 102 and a hardware processor (e.g. central processing unit (CPU), graphics processing unit (GPU), etc.) for provisioning the deep learning model 102 from the memory to the client 103 over the wired or wireless connection. The server 101 may provision the deep learning model 102 to the client 103 by sending a copy of the deep learning model 102 over the wired or wireless connection to the client 103.

Also with respect to the present description, the client 103 may be any computing device—including, without limitation, computing devices that are wholly or partially virtualized—capable of communicating with the server 101 over the wired or wireless connection, for the purpose of receiving from the server 101 a deep learning model 102 for use by the software application 104 installed on the client 103. Thus, the client 103 may not necessarily be an end-user device (e.g. personal computer, laptop, mobile phone, etc.) but may also be a server or other cloud-based computer system having the software application 104 installed thereon. In the case where the client 103 is a cloud-based computer system, output of the software application 104 may optionally be streamed or otherwise communicated to an end-user device. Generally, the client 103 may include a memory for storing the deep learning model 102 and a processor by which the software application 104 installed on the client 103 uses the deep learning model 102 for performing inferencing operations and generating inferences on input data. By storing a copy of the deep learning model 102 at the client (e.g. on a hard drive of the client), the client executes the deep learning model 102 locally.

The deep learning model 102 is a machine learned network (e.g. deep neural network) that is trained to perform inferencing operations to generate inferences (e.g., provide inferenced data) from input data. The deep learning model 102 may be trained using supervised, semi-supervised, or unsupervised training techniques. Optionally, the server 101 may be used to perform the training of the deep learning model 102, or may receive the already trained deep learning model 102 from another device.

The deep learning model 102 may be trained to perform inferencing of any type of determination or for making any desired type of inferences. However, in the present embodiment, the deep learning model 102 outputs inferences that are usable by the software application 104 installed on the client 103. It should be noted that the deep learning model 102 may similarly be used by other software applications which may be installed on the client 103 or other clients, and thus may not necessarily be specifically trained for use by the software application 104 but instead may be trained more generically for use by multiple different software applications. In any case, the deep learning model 102 may not be coded within the software application 104 itself, but may be accessible to the software application 104 as external functionality (e.g. as a software patch) via an application programming interface (API). As a result, the deep learning model 102 may not necessarily be developed and provided by the same developer of the software application 104 but instead may be developed and provided by a third party developer.

In the present embodiment, the software application 104 installed on the client 103 provides input data to the deep learning model 102 which processes the input data to determine one or more inferences (i.e., inferenced data) from the input data. Accordingly, the deep learning model 102 is trained to process the input data and make inferences therefrom. The inferenced data is output by the deep learning model 102 to the software application 104 for use by functions, tasks, etc. of the software application 104.

There are various use cases for the system 100 described above. In one embodiment, the software application 104 may be a video game, virtual reality application, or other graphics-related computer program. In this embodiment, the deep learning model 102 may provide certain image-related inferences, such as providing from an input image or other input data an anti-aliased image, an image with upscaled resolution, a denoised image, inpainting, and/or any other output image that is modified in at least one respect from the input image or other input data. As another example, the deep learning model 102 may perform inferencing operations to generate an inference output that can be used to provide certain video-related features, such as providing from input video or other input data a slow motion version of the input video or other input data, a super sampling of the input video or other input data, etc.

In another embodiment, the software application 104 may be a voice recognition application or other audio-related computer program. In this embodiment, the deep learning model 102 may perform inferencing operations to generate an inference output that can be used to provide certain audio-related features, such as providing from an input audio or other input data a language translation, a voice recognized command, and/or any other output that is inferenced from the input audio or other input data.

When the developer of the deep learning model wants to update or improve the model, they may need to gather new data to be used to re-train the model. In the past, a developer could be required to write explicit code that would retrieve data from running processes, in order to gather the data needed to create a new dataset useful for retraining a deep learning model. If the new dataset was required (by definition) to include data from other sources (e.g. in memory, etc.) not previously used in creating prior datasets, then the developer would be required to change the explicit code (e.g., programmed instructions) to access the data from the additional sources and then re-run the code to retrieve all required data.

To address any changing requirements to input data used to create datasets for training deep learning models, the embodiments below describe systems and methods for creating datasets using tagged data. These systems and methods will allow required input data to be gathered automatically, without requiring the above described manual change to the code used to gather the input data. This is accomplished by tagging data of the software application 104, and then using the tags to retrieve from the software application 104 input data currently required by the dataset definition.

It should be noted that the systems and methods described below may be implemented in the context of the system 100 of FIG. 1, but are not necessarily limited thereto.

Figure 2:
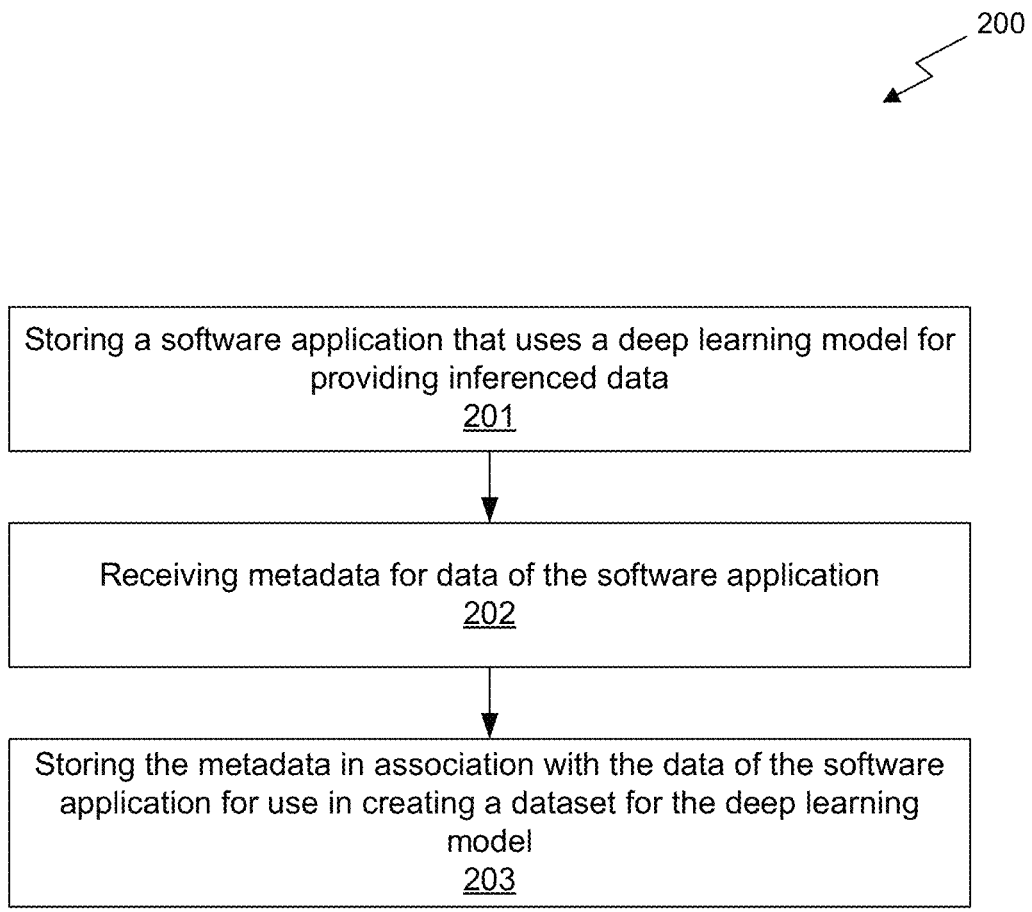
FIG. 2 illustrates a flowchart of a client method for tagging data for use in creating a dataset to be used for improving a deep learning model, in accordance with an embodiment.

FIG. 2 illustrates a flowchart of a client method 200 for tagging data for use in creating a dataset to be used for improving a deep learning model, in accordance with an embodiment. Accordingly, in one embodiment, the method 200 may be performed by the client 103 of FIG. 1.

In operation 201, a software application is stored. In the context of the present method 200, the software application is configured to use a deep learning model for performing inferencing operations and providing inferenced data (e.g. such as software application 104 that uses deep learning model 102 in FIG. 1). The software application may be stored and/or executed locally (e.g. by the client 103 of FIG. 1).

In operation 202, metadata is received for data of the software application. The data includes any data stored or processed by the software application or stored for use by the software application. For example, the data may be generated as an output using the software application during execution thereof (e.g. a graphical image or user interface generated by the software application). The data may also be generated as a set of configuration or calibration settings of an instantiation of the software application, and/or to be applied to output produced using the software application. Further, the data may be stored in memory used by the software application, such as CPU random access memory (RAM) and/or GPU RAM.

In one embodiment, the metadata may be received for specific portions of the memory storing different data of the software application. Thus, the metadata may be received for the data by being received for specific portions of the memory storing the data. For example, the specific portions of the memory may each store a different type of data, data output by a specific function or process of the software application, etc. The portions of the memory may be particular data structures (e.g. custom or common data structures used by the software application), buffers (e.g. intermediate rendering buffers used in a rendering pipeline), etc. In one exemplary embodiment where the software application is a graphics-related software application, metadata may be received for various buffers used in a graphics processing pipeline, such as a depth buffer, a normal buffer, etc.

In the context of the present description, the metadata is any descriptive information for the data of the software application. For example, the metadata may categorize the data of the software application, may name the data of the software application, etc. As an option, the metadata may comply with a nomenclature specified for the deep learning model. For example, a developer or provider of the deep learning model may publish a particular nomenclature to be used for the deep learning model when configuring required input data for the deep learning model. In one embodiment, the metadata may be received by a developer of the software application or other user having knowledge of the data of the software application. The metadata may further be received in any desired format, such as extendible markup language (XML).

Further, as shown in operation 203, the metadata is stored in association with the data of the software application for use in creating a dataset for the deep learning model. For example, the metadata may be assigned to the data of the software application for use in creating the dataset, which then may be used to train the deep learning model. Of course, it should be noted that the metadata may be stored in any manner that associates it with the corresponding data of the software application for which the metadata was received.

In one embodiment, the metadata received for particular data of the software application may be inserted in a portion of code of the software application that stores (in memory) or accesses (in memory) the particular data. In another embodiment, the metadata received for particular data of the software application may be inserted in a portion of code of the software application that defines the locations in memory in which the data is (to be) stored. In yet another embodiment, the metadata may be stored in a reference table that maps each metadata to the corresponding data and/or location in memory in which the data is stored.

To this end, the method 200 can be implemented as a way to tag the data of the software application with the metadata by storing an association (relationship) therebetween. The tagged data may then be used for creating a dataset that can in turn be used to train, and improve, the deep learning model, for example as described with reference to the Figures below.

Figure 3:
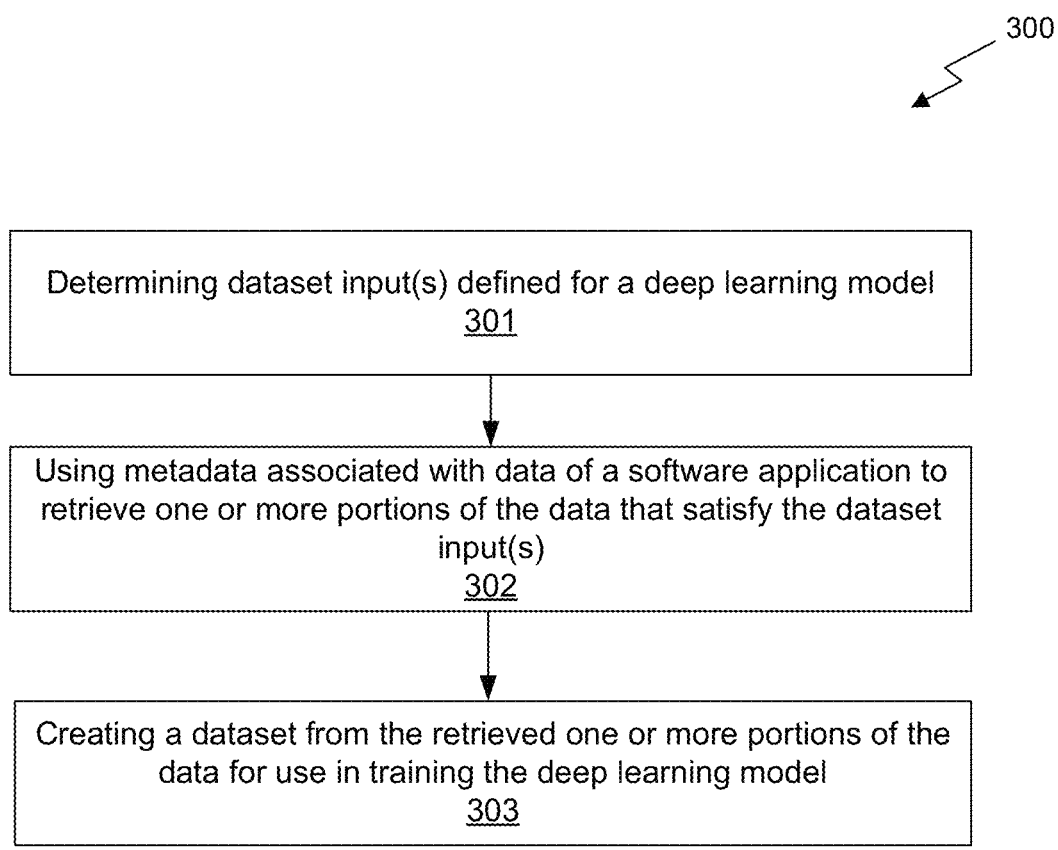
FIG. 3 illustrates a flowchart of a client method for creating a dataset using tagged data for use in improving a deep learning model, in accordance with an embodiment.

FIG. 3 illustrates a flowchart of a client method 300 for creating a dataset using tagged data for use in improving a deep learning model, in accordance with an embodiment. For example, in one embodiment, the method 300 may be performed by the client 103 of FIG. 1. Further, the method 300 may use the tagged data disclosed with respect to FIG. 2 above.

In operation 301, one or more dataset inputs defined for a deep learning model are determined. In the context of the present method 300, the deep learning model is usable for performing inferencing operations and/or providing inferenced data to a software application (e.g. such as the deep learning model 102 used by the software application 104 of FIG. 1). The deep learning model may be stored locally (e.g. by the client 103). In one embodiment, the deep learning model may be stored in a local repository with other deep learning models usable for performing inferencing operations and/or providing other types of inferenced data to the software application or other software applications.

The deep learning model is trained (configured) to receive certain input(s) and output certain output(s). However, the deep learning model is capable of being improved by being retrained. Retraining the deep learning model requires a new dataset to be used as basis for the retraining.

The dataset input(s) defined for the deep learning model refer to the input(s) to be used in generating the new dataset. These input(s) may be specified as dataset identifiers in any desired manner. For example, the input(s) may be specified as tags selected in accordance with a particular nomenclature used for the deep learning model (e.g. predefined for use in configuring the input(s) for the new dataset). In one embodiment, the input(s) may be determined from a dataset definition file defined for the deep learning model.

In operation 302, metadata associated with data of a software application is used to retrieve one or more portions of the data that satisfy the dataset input(s). The software application may refer to one being executed to use the deep learning model to obtain inferenced data therefrom. Thus, operation 302 may access memory used by the software application to retrieve therefrom the input data required to create the new dataset for the deep learning model.

In one embodiment, an identifier (e.g. name, etc.) of the dataset input(s) determined in operation 301 may be matched to, or otherwise correlated with, metadata defined for certain data of the software application. The certain data of the software application associated with that metadata may then be retrieved. In the example above where the dataset input(s) are specified as tags, the present operation may retrieve from the software application data tagged with metadata matching, or closely (e.g. fuzzy) matching, those tags.

In operation 303, a dataset is created from the one or more portions of the data retrieved from the software application for use in training the deep learning model (or another deep learning model). In other words, the data of the software application satisfying the dataset input(s) is saved in a new dataset (e.g. in a dataset file, etc.). This new dataset may be stored locally and/or uploaded for storage remotely at a server capable of being used to retrain the deep learning model. The deep learning model can then be retrained using the new dataset, for example as described below with respect to FIG. 4.

Figure 4:
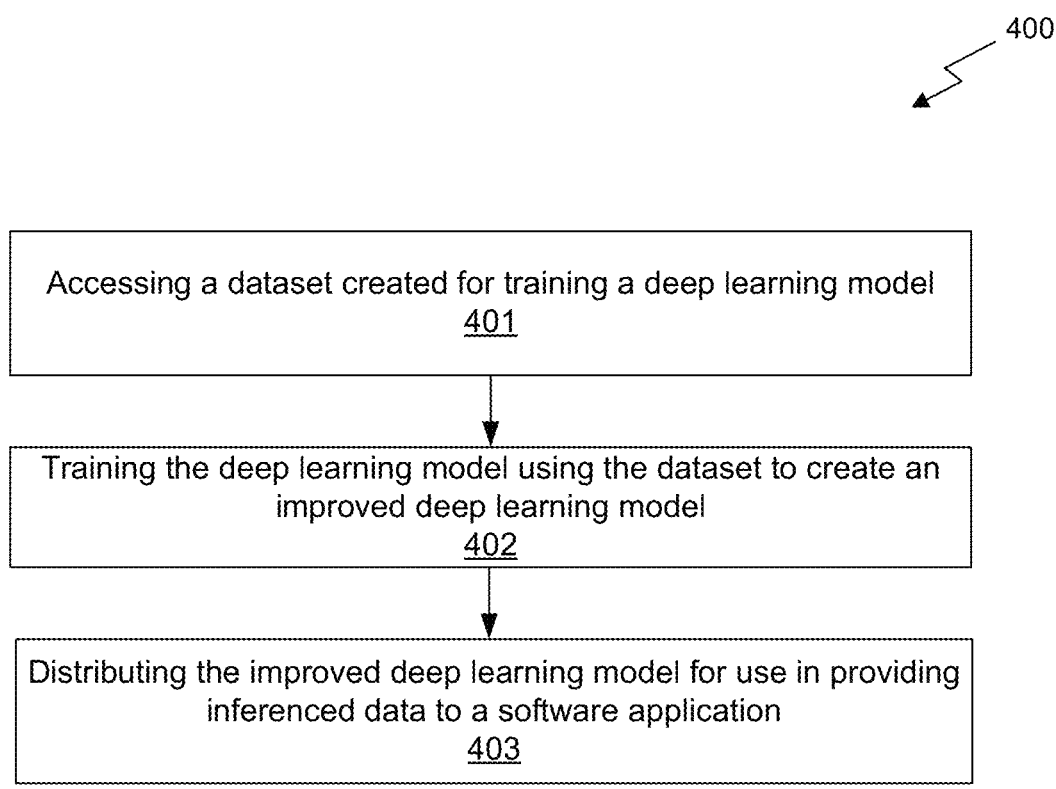
FIG. 4 illustrates a server method for improving a deep learning model using a newly created dataset, in accordance with an embodiment.

FIG. 4 illustrates a server method 400 for improving a deep learning model using a newly created dataset, in accordance with an embodiment. In one embodiment, the method 400 may be performed by the server 101 of FIG. 1. In another embodiment, the method 400 may be performed following the method 300 of FIG. 3.

In operation 401, a dataset created for training a deep learning model is accessed. The dataset may be the newly created dataset from operation 303 of FIG. 3, in one embodiment, and may be accessed from local memory. In any case, the dataset is one that has been created in accordance with current dataset input requirements defined in a dataset definition for the deep learning model.

In operation 402, the deep learning model is trained using the dataset. In one or more embodiments, the deep learning model is a previously trained deep learning model that is retrained to create an improved deep learning model. In other words, the previously trained deep learning model may be retrained using the new dataset accessed in operation 401. Further, in operation 403, the improved deep learning model is distributed for use in performing inferencing operations and/or providing inferenced data to a software application. For example, the improved deep learning model may be distributed back to a client system having the software application installed thereon (e.g. client 103). In this way, the software application can use the improved deep learning model for obtaining inferenced data, namely by providing data of the software application as input to the improved deep learning model for processing thereof to generate output that includes the inferenced data, and then providing the inferenced data to the software application.

Figure 5A:
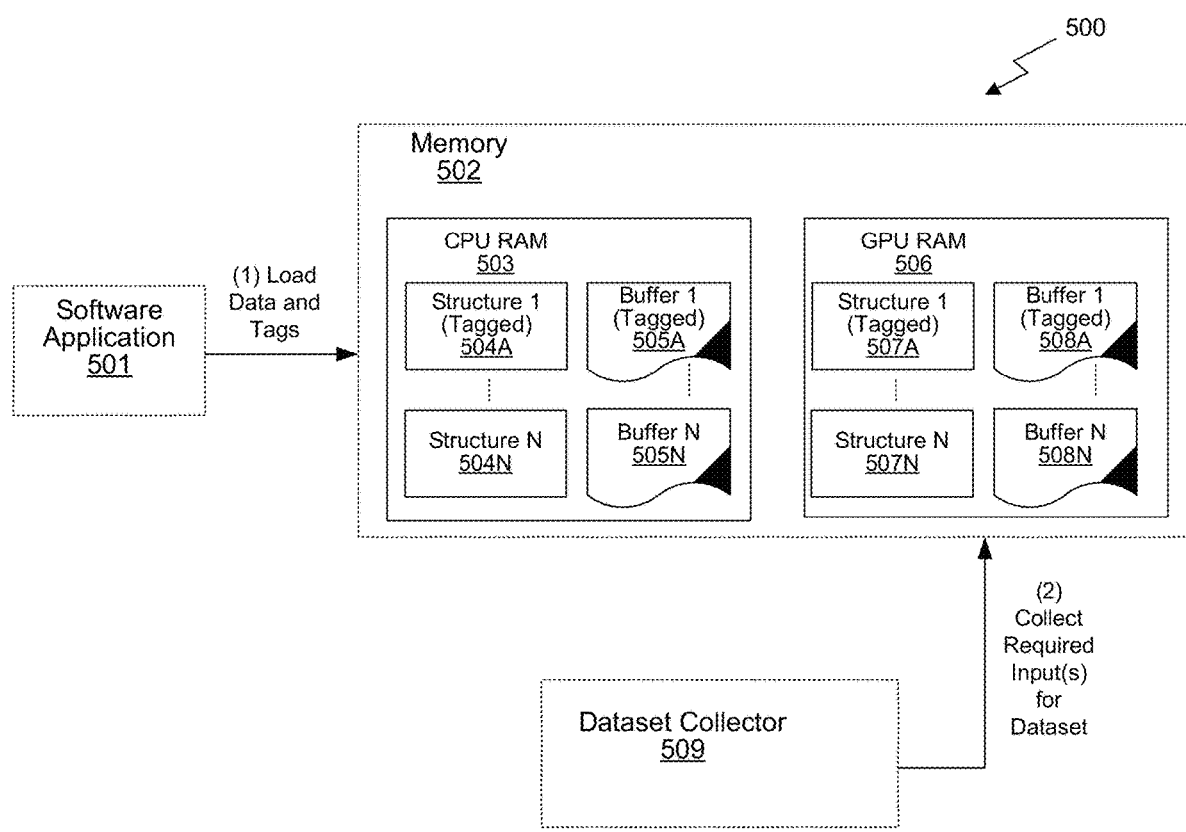
FIG. 5A illustrates a block diagram of a client system for tagging data and creating a dataset using tagged data for use in improving a deep learning model, in accordance with an embodiment.

FIG. 5A illustrates a block diagram of a client system 500 for tagging data and creating a dataset using tagged data for use in training or retraining a deep learning model, in accordance with an embodiment. It should be noted that the definitions and/or descriptions provided with respect to the embodiments above may equally apply to the present description.

As shown, a software application 501 interfaces a memory 502. In the present embodiment, the memory 502 includes CPU RAM 503 and GPU RAM 506, but may also include other types of memory in other embodiments. The CPU RAM 503 stores one or more buffers 505A-N and one or more other (e.g. custom or common) data structures 504A-N. Similarly, the GPU RAM 506 stores one or more buffers 508A-N and one or more other data structures 507A-N. The software application 501 may use the buffers 505A-N and one or more other data structures 504A-N of the CPU RAM 503 and/or the one or more buffers 508A-N and one or more other data structures 507A-N of the GPU RAM 506 for storing data therein. The data may be any data generated, or otherwise used, by the software application 501.

During execution, the software application 501 loads data into the memory 502 and tags the data with metadata. The software application 501 may be configured (e.g. by a developer) to tag the data with certain metadata once loaded into the memory 502. In the embodiment shown, the software application 501 tags the data by tagging locations in the memory 502 in which the data is stored (e.g. tagged data structure 504A, tagged buffer 505A, etc.).

The software application 501 also interfaces a dataset collector 509. In another embodiment, the dataset collector may be permanently running on the client or be triggered by a monitoring process or system driver (e.g. CPU or GPU device driver). In any case, the dataset collector 509 is executable computer code that creates a dataset from the data stored in the memory 502, for use in retraining a deep learning model used by the software application 501.

When called or triggered, the dataset collector 509 collects data from the memory 502 that satisfies dataset input(s) specified for the deep learning model. The dataset collector 509 uses the tags provided for the data by the software application 501 to determine and retrieve those portions of the data in the memory 502 that satisfy the dataset input(s). The dataset collector 509 further saves the retrieved data in a new dataset, thereby creating a dataset usable for retraining the deep learning model.

Figure 5B:
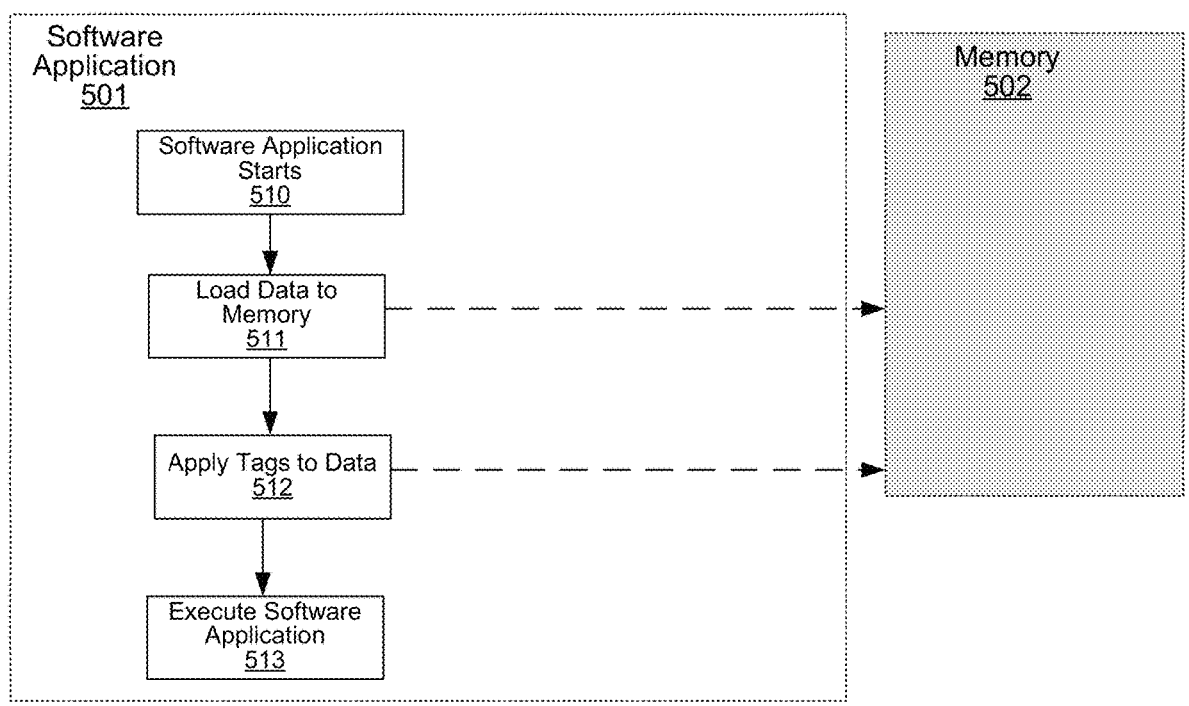
FIG. 5B illustrates a flowchart of a method of the software application of FIG. 5A, in accordance with an embodiment.

FIG. 5B illustrates a flowchart of a method of the software application of FIG. 5A, in accordance with an embodiment. As shown in operation 510, the software application 501 starts. The software application 501 may start upon initiation of the software application 501 by a user or by another software application.

Then, in operation 511, the software application 501 loads data into memory 502. The data that is loaded into memory 502 is data that is used by the software application 501 for executing various functions, performing various processes, etc. In one embodiment, operation 511 may include configuring or instantiating various data structures and/or buffers in the memory 502 for use in storing data generated, or used, by the software application 501 during execution thereof.

In operation 512, tags are applied to the data (in the memory 502). The tags are metadata that describe the data. Thus, different portions of the data may be tagged with different metadata.

In operation 513, the software application 501 executes (e.g. to perform various functions that use the memory 502). In one embodiment, the software application 501 may call the deep learning model to process input data from the memory 502. The deep learning model may then be executed to perform inferencing operations and to output inferences (e.g., as inferenced data) for the input data. The inferenced data may be provided to the software application 501 for use thereof as desired.

Figure 5C:
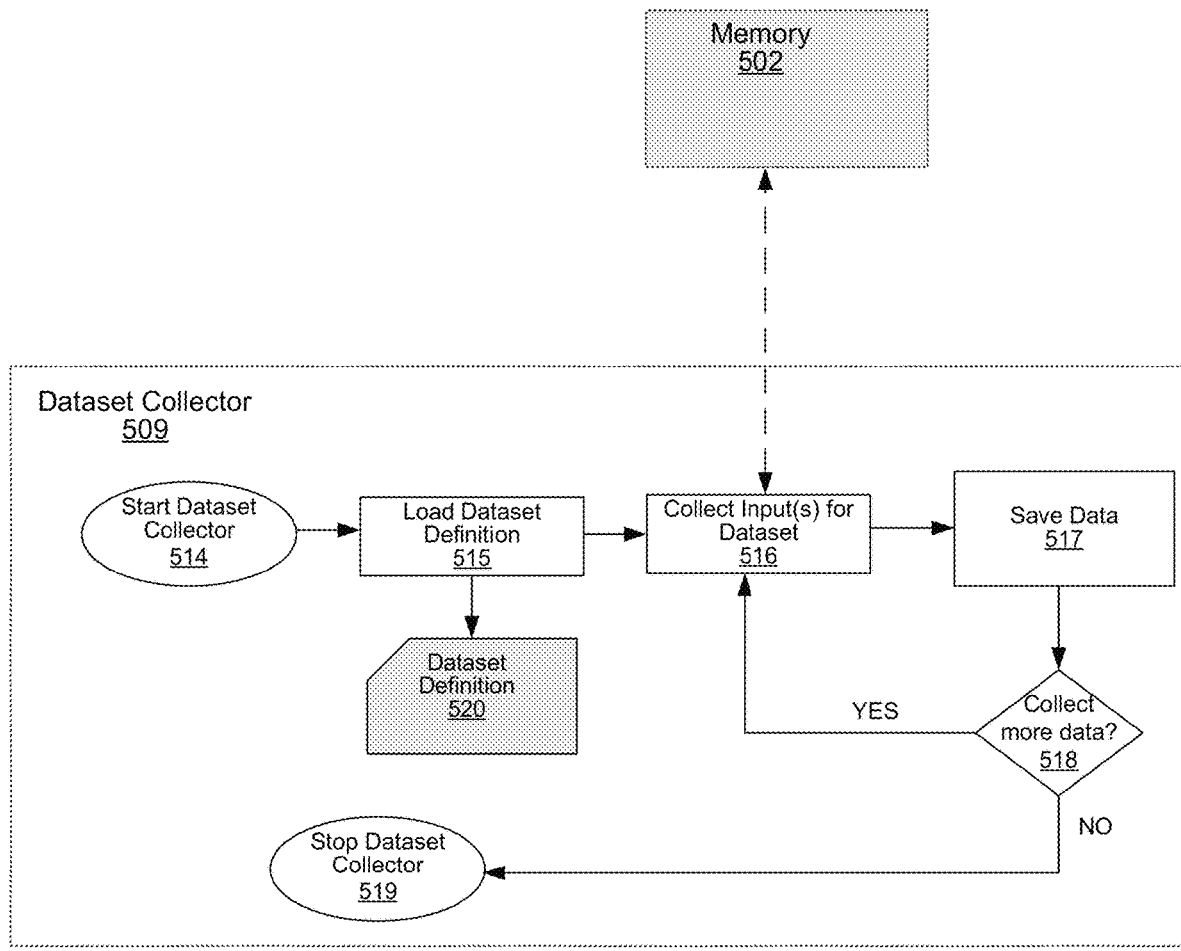
FIG. 5C illustrates a flowchart of a method of the dataset collector of FIG. 5A, in accordance with an embodiment.

FIG. 5C illustrates a flowchart of a method of the dataset collector of FIG. 5A, in accordance with an embodiment. As shown in operation 514, the dataset collector 509 is started. In the present embodiment, operation 514 occurs in response to any desired trigger. For example, the trigger may be a request from a server system (e.g. server 101) for a new dataset. As another example, the trigger may occur based on a schedule. Thus, the dataset collector 509 is started for creating a new dataset that can be used to retrain a deep learning model.

In operation 515, a dataset definition 520 is loaded. The dataset definition 520 may be loaded from any memory (e.g. local memory) storing the same. The dataset definition 520 indicates at least the minimum required dataset input(s) for creating a dataset for the deep learning model. For example, the dataset input(s) may be indicated using tags that correlate with tagged data in the memory 502.

In operation 516, data is collected from the memory 502 that satisfies the dataset input(s) defined for the deep learning model. For example, the tags indicating the dataset input(s) may be matched to tags in the memory 502, and data in the memory 502 associated with those tags may be collected.

In operation 517, the collected data is saved (e.g. in a dataset). The collected data may be saved to a local memory and/or a remote server memory (e.g. memory of server 101). In decision 518 it is determined whether more data is to be collected from the memory 502. For example, it may be determined whether the dataset definition specifies a maximum amount of data to collect or for additional data to be collected. In response to determining that more data is to be collected from the memory 502, operation 516 is repeated. In response to determining that more data is not to be collected from the memory 502, the dataset collector is terminated in operation 519.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 615 for a deep learning or neural learning system are provided below in conjunction with FIGS. 6A and/or 6B.

In at least one embodiment, inference and/or training logic 615 may include, without limitation, a data storage 601 to store forward and/or output weight and/or input/output data corresponding to neurons or layers of a neural network trained and/or used for inferencing in aspects of one or more embodiments. In at least one embodiment data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 601 may be included with other on-chip or off-chip data storage, including a processor's L1, L2, or L3 cache or system memory.

In at least one embodiment, any portion of data storage 601 may be internal or external to one or more processors or other hardware logic devices or circuits. In at least one embodiment, data storage 601 may be cache memory, dynamic randomly addressable memory ("DRAM"), static randomly addressable memory ("SRAM"), non-volatile memory (e.g., Flash memory), or other storage. In at least one embodiment, choice of whether data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 615 may include, without limitation, a data storage 605 to store backward and/or output weight and/or input/output data corresponding to neurons or layers of a neural network trained and/or used for inferencing in aspects of one or more embodiments. In at least one embodiment, data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 605 may be included with other on-chip or off-chip data storage, including a processor's L1, L2, or L3 cache or system memory. In at least one embodiment, any portion of data storage 605 may be internal or external to on one or more processors or other hardware logic devices or circuits. In at least one embodiment, data storage 605 may be cache memory, DRAM, SRAM, non-volatile memory (e.g., Flash memory), or other storage. In at least one embodiment, choice of whether data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 601 and data storage 605 may be separate storage structures. In at least one embodiment, data storage 601 and data storage 605 may be same storage structure. In at least one embodiment, data storage 601 and data storage 605 may be partially same storage structure and partially separate storage structures. In at least one embodiment, any portion of data storage 601 and data storage 605 may be included with other on-chip or off-chip data storage, including a processor's L1, L2, or L3 cache or system memory.

In at least one embodiment, inference and/or training logic 615 may include, without limitation, one or more arithmetic logic unit(s) ("ALU(s)") 610 to perform logical and/or mathematical operations based, at least in part on, or indicated by, training and/or inference code, result of which may result in activations (e.g., output values from layers or neurons within a neural network) stored in an activation storage 620 that are functions of input/output and/or weight parameter data stored in data storage 601 and/or data storage 605. In at least one embodiment, activations stored in activation storage 620 are generated according to linear algebraic and or matrix-based mathematics performed by ALU(s) 610 in response to performing instructions or other code, wherein weight values stored in data storage 605 and/or data 601 are used as operands along with other values, such as bias values, gradient information, momentum values, or other parameters or hyperparameters, any or all of which may be stored in data storage 605 or data storage 601 or another storage on or off-chip. In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 601, data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 615 illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6A may be used in conjunction with central processing unit ("CPU") hardware, graphics processing unit ("GPU") hardware or other hardware, such as field programmable gate arrays ("FPGAs").

Figure 6A:
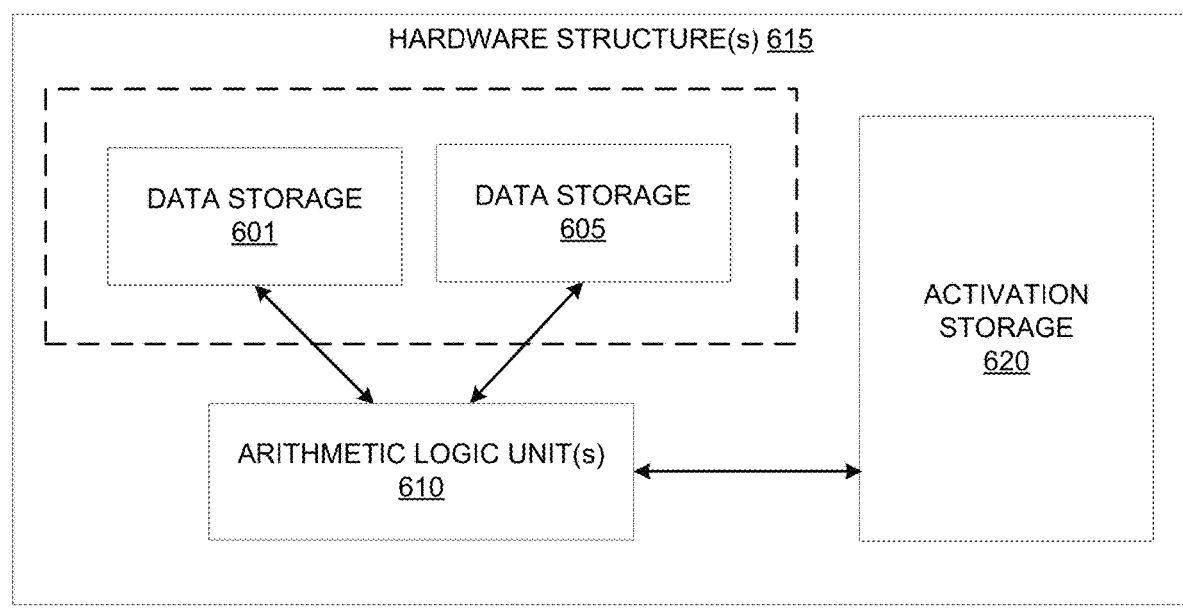
FIG. 6A illustrates inference and/or training logic, according to at least one embodiment.
Figure 6B:
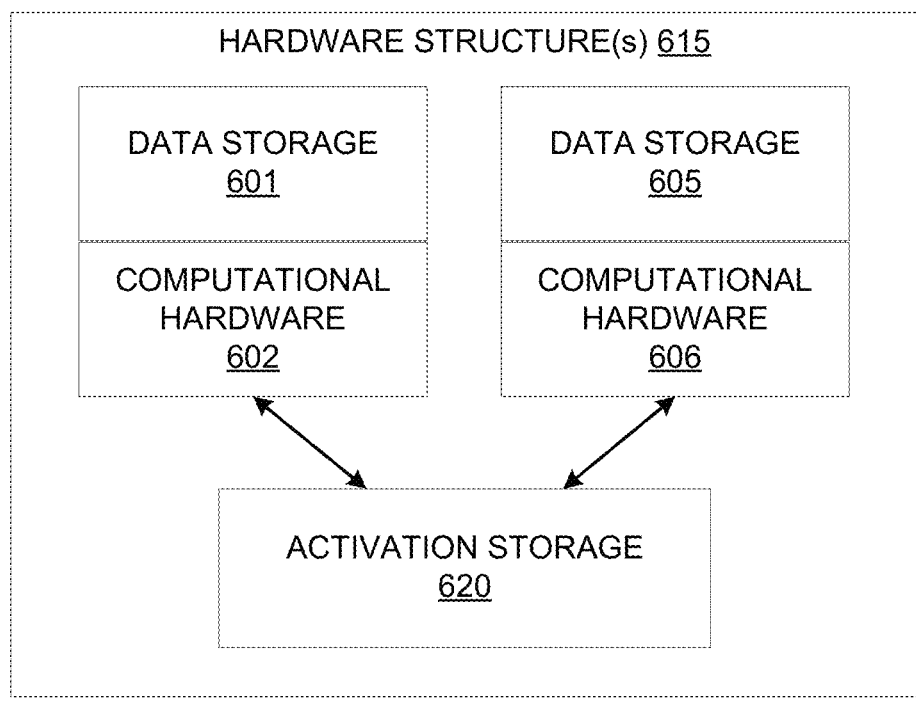
FIG. 6B illustrates inference and/or training logic, according to at least one embodiment.

FIG. 6B illustrates inference and/or training logic 615, according to at least one embodiment. In at least one embodiment, inference and/or training logic 615 may include, without limitation, hardware logic in which computational resources are dedicated or otherwise exclusively used in conjunction with weight values or other information corresponding to one or more layers of neurons within a neural network. In at least one embodiment, inference and/or training logic 615 illustrated in FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6B may be used in conjunction with central processing unit (CPU) hardware, graphics processing unit (GPU) hardware or other hardware, such as field programmable gate arrays (FPGAs). In at least one embodiment, inference and/or training logic 615 includes, without limitation, data storage 601 and data storage 605, which may be used to store weight values and/or other information, including bias values, gradient information, momentum values, and/or other parameter or hyperparameter information. In at least one embodiment illustrated in FIG. 6B, each of data storage 601 and data storage 605 is associated with a dedicated computational resource, such as computational hardware 602 and computational hardware 606, respectively. In at least one embodiment, each of computational hardware 606 comprises one or more ALUs that perform mathematical functions, such as linear algebraic functions, only on information stored in data storage 601 and data storage 605, respectively, result of which is stored in activation storage 620.

In at least one embodiment, each of data storage 601 and 605 and corresponding computational hardware 602 and 606, respectively, correspond to different layers of a neural network, such that resulting activation from one "storage/computational pair 601/602" of data storage 601 and computational hardware 602 is provided as an input to next "storage/computational pair 605/606" of data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic 615.

Neural Network Training and Deployment

Figure 7A:
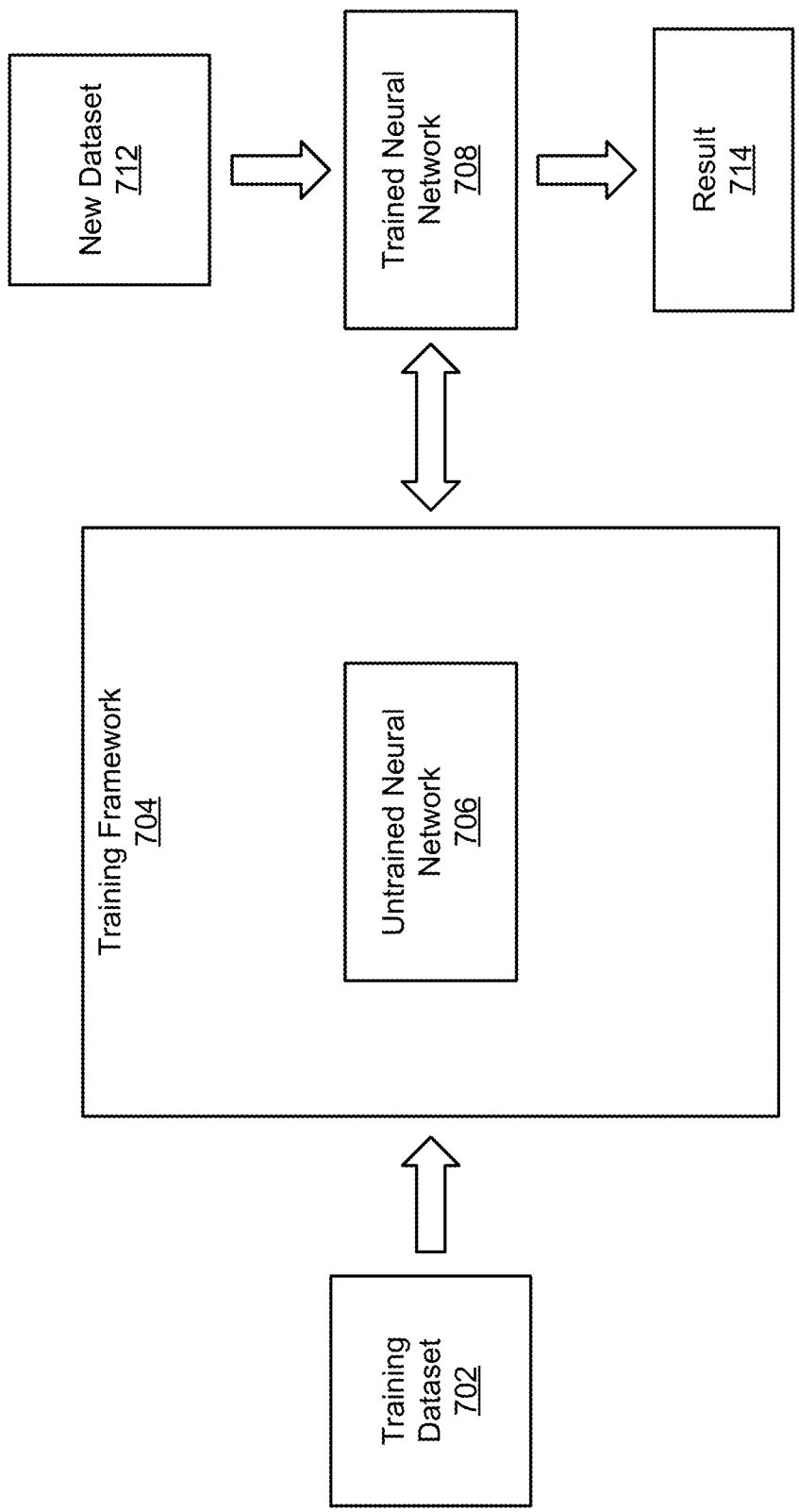
FIG. 7A illustrates training and deployment of a neural network, according to at least one embodiment.

FIG. 7A illustrates another embodiment for training and deployment of a deep neural network. In at least one embodiment, untrained neural network 706 is trained using a training dataset 702. In at least one embodiment, training framework 704 is a PyTorch framework, whereas in other embodiments, training framework 704 is a Tensorflow, Boost, Caffe, Microsoft Cognitive Toolkit/CNTK, MXNet, Chainer, Keras, Deeplearning4j, or other training framework. In at least one embodiment training framework 704 trains an untrained neural network 706 and enables it to be trained using processing resources described herein to generate a trained neural network 708. In at least one embodiment, weights may be chosen randomly or by pre-training using a deep belief network. In at least one embodiment, training may be performed in either a supervised, partially supervised, or unsupervised manner.

In at least one embodiment, untrained neural network 706 is trained using supervised learning, wherein training dataset 702 includes an input paired with a desired output for an input, or where training dataset 702 includes input having known output and the output of the neural network is manually graded. In at least one embodiment, untrained neural network 706 is trained in a supervised manner processes inputs from training dataset 702 and compares resulting outputs against a set of expected or desired outputs. In at least one embodiment, errors are then propagated back through untrained neural network 706. In at least one embodiment, training framework 704 adjusts weights that control untrained neural network 706. In at least one embodiment, training framework 704 includes tools to monitor how well untrained neural network 706 is converging towards a model, such as trained neural network 708, suitable to generating correct answers, such as in result 714, based on known input data, such as new data 712. In at least one embodiment, training framework 704 trains untrained neural network 706 repeatedly while adjusting adjust weights to refine an output of untrained neural network 706 using a loss function and adjustment algorithm, such as stochastic gradient descent. In at least one embodiment, training framework 704 trains untrained neural network 706 until untrained neural network 706 achieves a desired accuracy. In at least one embodiment, trained neural network 708 can then be deployed to implement any number of machine learning operations.

In at least one embodiment, untrained neural network 706 is trained using unsupervised learning, wherein untrained neural network 706 attempts to train itself using unlabeled data. In at least one embodiment, unsupervised learning training dataset 702 will include input data without any associated output data or "ground truth" data. In at least one embodiment, untrained neural network 706 can learn groupings within training dataset 702 and can determine how individual inputs are related to untrained dataset 702. In at least one embodiment, unsupervised training can be used to generate a self-organizing map, which is a type of trained neural network 708 capable of performing operations useful in reducing dimensionality of new data 712. In at least one embodiment, unsupervised training can also be used to perform anomaly detection, which allows identification of data points in a new dataset 712 that deviate from normal patterns of new dataset 712.

In at least one embodiment, semi-supervised learning may be used, which is a technique in which in training dataset 702 includes a mix of labeled and unlabeled data. In at least one embodiment, training framework 704 may be used to perform incremental learning, such as through transferred learning techniques. In at least one embodiment, incremental learning enables trained neural network 708 to adapt to new data 712 without forgetting knowledge instilled within network during initial training.

Figure 7B:
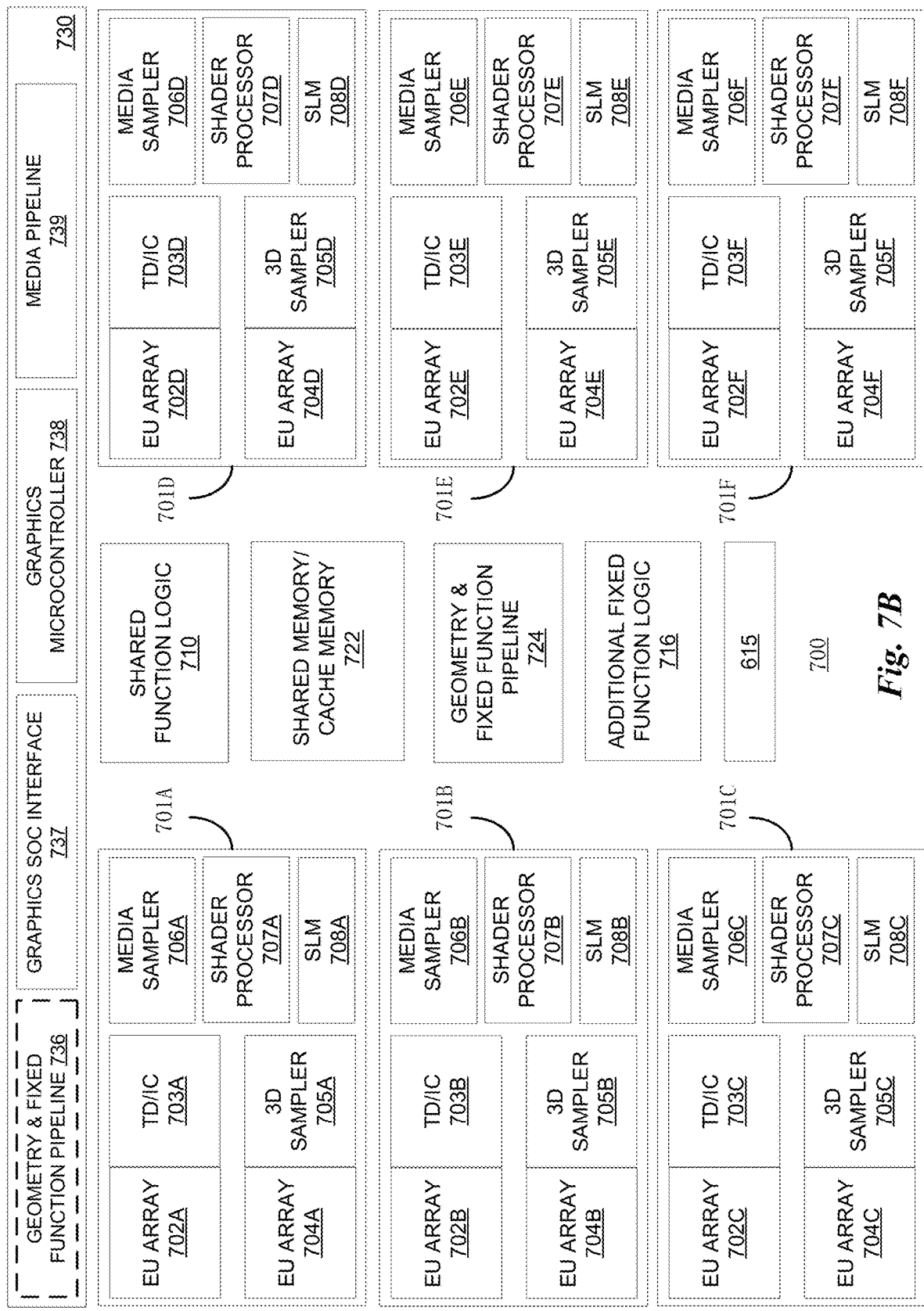
FIG. 7B is a block diagram of a system, according to at least one embodiment.

FIG. 7B is a block diagram of a system 700, according to at least one embodiment described herein. In at least one embodiment, system 700 may include a block 730 and blocks 701A-701F. In at least one embodiment, block 730 may include a geometry and fixed function pipeline 736. In at least one embodiment, block 730 may include a graphics SoC interface 737, a graphics microcontroller 738, and a media pipeline 739. In at least one embodiment, block 701A may include an EU array 702A, a TD/IC 703A, an EU array 704A, a 3D sampler 705A, a media sampler 706A, a shader processor 707A, and a SLM 708A. In at least one embodiment, block 701B may include an EU array 702B, a TD/IC 703B, an EU array 704B, a 3D sampler 705B, a media sampler 706B, a shader processor 707B, and a SLM 708B. In at least one embodiment, block 701C may include an EU array 702C, a TD/IC 703C, an EU array 704C, a 3D sampler 705C, a media sampler 706C, a shader processor 707C, and a SLM 708C. In at least one embodiment, block 701D may include an EU array 702D, a TD/IC 703D, an EU array 704D, a 3D sampler 705D, a media sampler 706D, a shader processor 707D, and a SLM 708D. In at least one embodiment, block 701E may include an EU array 702E, a TD/IC 703E, an EU array 704E, a 3D sampler 705E, a media sampler 706E, a shader processor 707E, and a SLM 708E. In at least one embodiment, block 701F may include an EU array 702F, a TD/IC 703F, an EU array 704F, a 3D sampler 705F, a media sampler 706F, a shader processor 707F, and a SLM 708F. In at least one embodiment, system 700 may include shared function logic 710, shared/cache memory 722, and a geometry and fixed function pipeline 724, as well as additional fixed function logic 716. In at least one embodiment, system 700 may include logic 615. Details regarding logic 615 are provided herein in conjunction with FIGS. 6A and/or 6B.

Data Center

Figure 8:
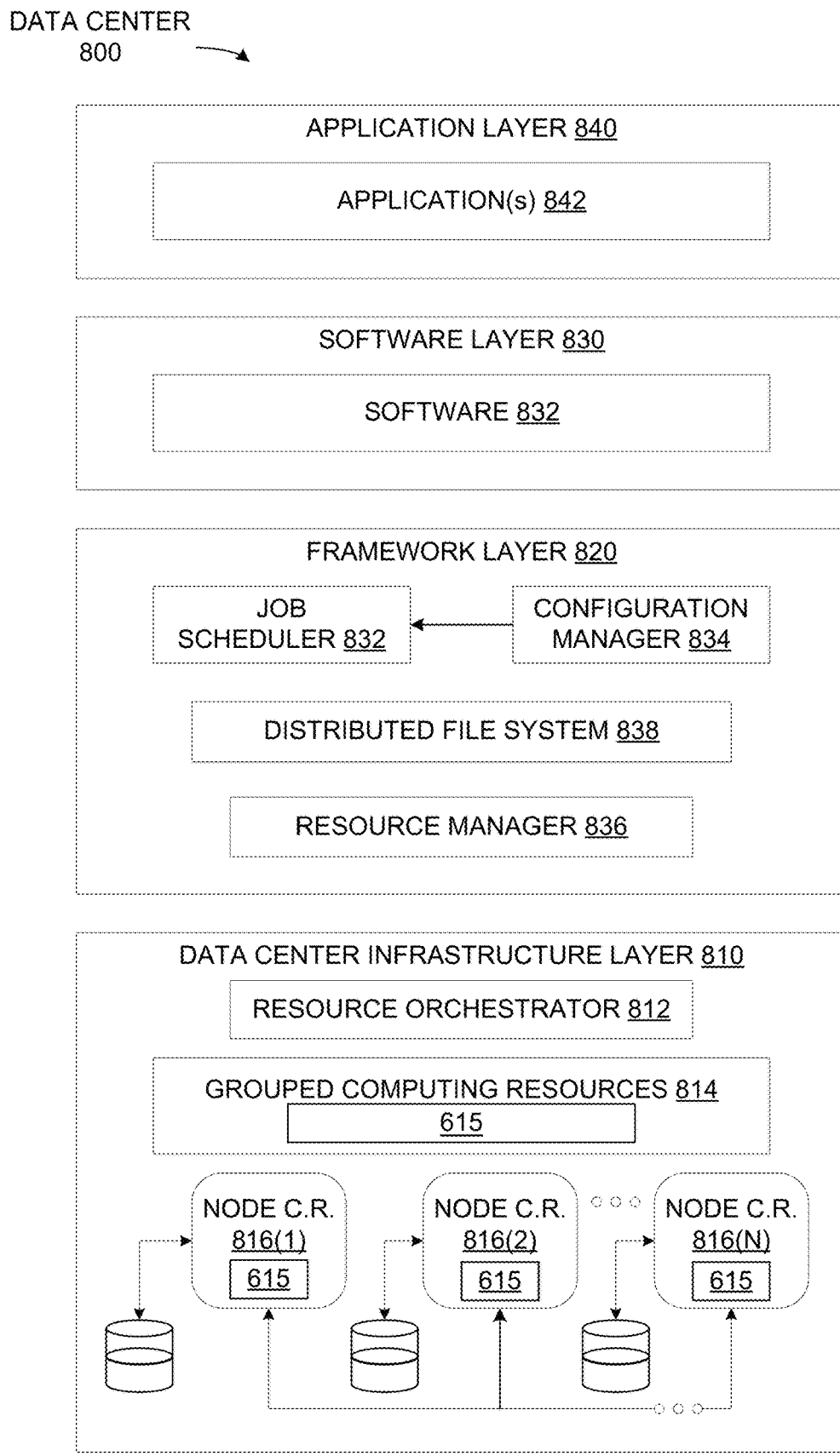
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830 and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 832, a configuration manager 834, a resource manager 836 and a distributed file system 838. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. In at least one embodiment, configuration manager 834 may be capable of configuring different layers such as software layer 830 and framework layer 820 including Spark and distributed file system 838 for supporting large-scale data processing. In at least one embodiment, resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. In at least one embodiment, resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. In at least one embodiment, inference and/or training logic 615 may be used in a system of FIG. 8 for inferencing or predicting operations based, at least in part, on weight parameters calculated using neural network training operations, neural network functions and/or architectures, or neural network use cases described herein.

As described herein, a method, computer readable medium, and system are disclosed for creating a dataset using tagged data for use in improving a deep learning model. In accordance with FIGS. 1-5C, an embodiment may provide a deep learning model usable for performing inferencing operations and for providing inferenced data, where the deep learning model is stored (partially or wholly) in one or both of data storage 601 and 605 in inference and/or training logic 615 as depicted in FIGS. 6A and 6B. Training and deployment of the deep learning model may be performed as depicted in FIG. 7A and described herein. For example, the deep learning model, when untrained, may subsequently be trained using training framework 704. Additionally, the deep learning model, when previously trained, may be updated to create an updated version of the deep learning model also using framework 704. Further, the updated version of a deep learning model may be distributed to a client for use in providing the inferenced data. Distribution of the trained or re-trained deep learning model may be performed using one or more servers in a data center 800 as depicted in FIG. 8 and described herein.

What is claimed is:

1. A method, comprising:
   causing an application to generate metadata to indicate one or more locations, in memory of the application, of neural network training data generated by the application.

2. The method of claim 1, wherein one or more identifiers correlated with the metadata are defined in a dataset definition file defined in accordance with a neural network using the neural network training data.

3. The method of claim 2, wherein the one or more identifiers are specified as tags.

4. The method of claim 2, further comprising using the metadata to retrieve the neural network training data from the application by at least:
   matching an identifier of the one or more identifiers to metadata associated with certain data of the application; and
   retrieving the certain data of the application.

5. The method of claim 1, wherein the metadata is associated with the neural network training data by being inserted in a portion of code of the application that defines the one or more locations, in the memory of the application, in which the neural network training data is to be stored.

6. The method of claim 5, wherein the one or more locations, in the memory of the application, include at least one of: a data structure; or a buffer.

7. The method of claim 1, further comprising creating a dataset from the neural network training data by at least saving the neural network training data in a new dataset.

8. The method of claim 7, further comprising:
   storing the new dataset locally.

9. The method of claim 7, further comprising:
causing the new dataset to be stored remotely at a server; and
   wherein the server uses the new dataset to perform at least one of:
      retraining a neural network trained using the neural network training data; or
      training another neural network.

10. The method of claim 1, wherein a dataset collector that interfaces the application retrieves the neural network training data.

11. The method of claim 10, wherein the dataset collector, the application, and a neural network to use the neural network training data are instantiated on a client system.

12. The method of claim 1, further comprising:
receiving an improved version of a neural network resulting from training of the neural network using the neural network training data.

13. The method of claim 12, further comprising:
providing at least a portion of the neural network training data as input to the improved version of the neural network, wherein the improved version of the neural network processes the input to generate inferenced data; and
receiving the inferenced data as output of the neural network, wherein the inferenced data is provided to the application.

14. The method of claim 1, wherein a neural network trained using the neural network training data is executable to perform inferencing operations that provide inferenced data to the application.

15. The method of claim 1, wherein the neural network training data is data processed using the application.

16. The method of claim 1, wherein the neural network training data is a set of configuration or calibration settings of an instantiation of the application.

17. The method of claim 1, further comprising:
storing the metadata in association with the neural network training data.

18. A system, comprising:
a memory storing instructions; and
one or more processors that execute the instructions to cause an application to generate metadata to indicate one or more locations, in memory of the application, of neural network training data generated by the application.

19. The system of claim 18, wherein the memory further stores the metadata and associated data of the application.

20. A processor, comprising: one or more circuits to cause an application to generate metadata to indicate one or more locations, in memory of the application, of neural network training data generated by the application.

* * * * *